United States Patent Office 2,907,779
Patented Oct. 6, 1959

2,907,779

UNSATURATED DIESTER ACIDS

Sylvan O. Greenlee, Racine, Wis., assignor to
S. C. Johnson & Son, Inc., Racine, Wis.

No Drawing. Application June 30, 1955
Serial No. 519,274

5 Claims. (Cl. 260—410.5)

This invention embraces a new class of synthetic esters prepared from an unsaturated aliphatic acid and an aryloxy-substituted acid. More particularly, this invention relates to novel unsaturated diester acids obtained by esterifying the phenolic hydroxyl groups of an hydroxyaryl-substituted acid.

In the formulation of plasticized resin compositions, one of the greatest problems encountered is the manner of plasticizing and imparting air-drying or heat conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its miscibility even though the product is inferior with respect to toughness, chemical resistance or flexibility.

Long-chain unsaturated acids containing at least about 10 carbon atoms constitute suitable plasticizers. These materials also are desirable because of the conversion characteristics imparted due to their unsaturation. The present invention embraces the production of the esters from such acids and an hydroxyaryl-substituted acid. Esterification of the aryl hydroxyl groups of the latter with converting or plasticizing acids produces products having a high degree of versatility in the preparation of resins. The subject diester acids may be employed, for example, to produce resinous compositions valuable as coatings, by reacting the same with polyhydric alcohols or polyamines. The products of these reactions are the compounds claimed in copending applications S.N. 503,325, filed April 22, 1955, and S.N. 505,553, filed May 2, 1955, respectively.

The present compositions provide in each molecule a plasticizing or converting group together with aromatic nuclei which impart resinous characteristics. The subject diester acid, because of its unreacted carboxyl group, may be easily tailored to suit a particular need. For example, as noted in the applications referred to hereinabove, compounds having predetermined physical characteristics may be prepared, merely by the selection of a particular polyhydric alcohol or polyamine to react with the carboxyl group of the diester acid.

Compounds capable of accomplishing the above ends are the esters prepared from one or more long-chain unsaturated acids and a bis-(hydroxyaryl)-substituted aliphatic acid. Such compositions may be prepared, for example, by reacting 2 mols of the acid chloride of linoleic acid with 1 mol of 4,4-bis(4-hydroxyphenyl)-pentanoic acid.

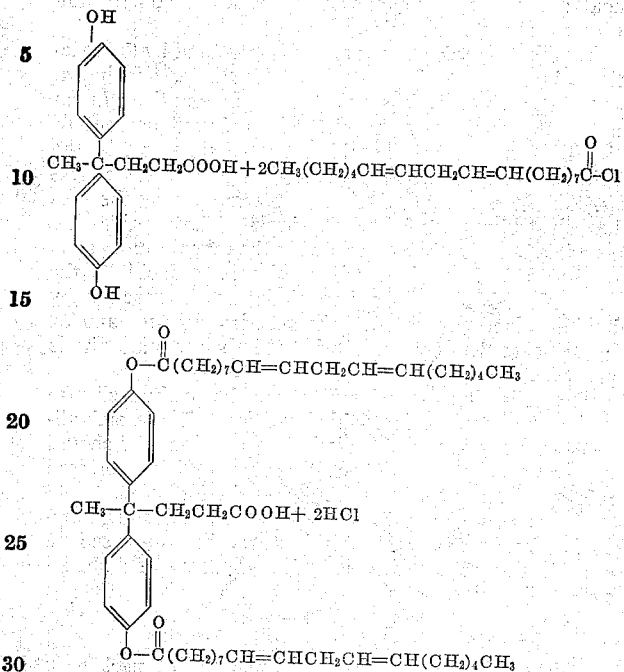

The aryloxy-substituted acid contemplated for use in preparing the desired unsaturated diester acid should have two hydroxyphenyl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid must be located next to a terminal carbon atom in order to obtain satisfactory yields. Prior applications, Serial Nos. 464,607 and 489,300, filed October 25, 1954, and February 18, 1955, respectively, disclose a number of illustrative compounds suitable for use as the aryloxy-substituted acid and methods of preparing the same. These materials, which are referred to for convenience as diphenol carboxylic acids, or DPA, consist of the condensation products of levulinic acid and phenol, substituted phenols, or mixtures thereof. It is to be understood that the phenolic nuclei of the diphenol carboxylic acids may be substituted with any groups which will not interfere with the esterification reactions. For example, the nuclei may be alkylated as disclosed in Serial No. 489,300 or they may be halogenated.

The long-chain acids which are contemplated for use in preparing the synthetic esters of this invention include the unsaturated mono carboxylic acids of at least about 10 carbon atoms and mixtures thereof. Illustrative of such acids are the drying oil fatty acids which normally contain from 18 to 22 carbon atoms, such as acids obtained by the saponification of naturally-occurring unsaturated vegetable oils including China-wood oil, oiticica oil, linseed oil, soybean oil, corn oil, and cottonseed oil. The fish oils constitute another important source of operable unsaturated acids. These materials, derived principally from the menhaden and the sardine, contain the glycerides of highly unsaturated acids and have an iodine value ranging from about 130 to 190. Suitable acids may be produced by other synthetic means, for example, mixed linoleic acids may be obtained by saponifying dehydrated castor oil. Oleic acid may be used to prepare a linoleic acid by hydroxylating the same to form dihydroxystearic acid, followed by dehydration of the latter. Lower molecular weight unsaturated acids may also be used if only air-drying characteristics are desired, but those containing less than about 10 carbon atoms contribute little plasticization. An example of one of the lower plasticizing acids contemplated is undecenoic acid, a commercially available material, a decomposition product of castor oil acids.

The diester acids are conveniently prepared by the reaction of diphenol carboxylic acids with the long-chain unsaturated acid chlorides using the acid chlorides in an amount equivalent to the phenolic hydroxyl content of the diphenol carboxylic acid. It is possible to add the acid chlorides directly to the diphenol carboxylic acid and obtain esterification without interference by the carboxylic acid group of the DPA itself. The esterification reaction is normally carried out in the temperature range of 50–150° C. It is usually desirable to facilitate the removal of HCl as it is formed during the reaction by bubbling inert gas through the reaction mixture and/or by reducing the pressure considerably below atmospheric pressure.

The following examples illustrate the method of preparing the compounds of this invention. These embodiments are not intended to limit the invention, and should not be so construed. Quantities of materials expressed refer to parts by weight unless otherwise indicated.

Examples I to III illustrate the preparation of long-chain unsaturated acid chlorides of the type used in esterification of the phenolic hydroxyl groups of diphenol carboxylic acids.

EXAMPLE I

The reaction was carried out in a 2-liter, 3-neck flask provided with a dropping funnel, agitator, reflux condenser, and a thermometer. To an agitated mixture of 560 parts of soya fatty acids and 200 parts of benzene was added through the dropping funnel over a period of 2 hours 286 parts of thionyl chloride, holding the temperature during addition in the range of 60–65° C. The temperature was maintained at 65–80° C. for an additional 2½ hours, followed by removal of the benzene and excess thionyl chloride under reduced pressure. After removal of the benzene and unreacted thionyl chloride, the corresponding acid chloride was finally purified by vacuum distillation at 3 mm. pressure.

EXAMPLE II

In a procedure identical to that used in Example I, linseed oil acids were converted to the corresponding acid chlorides employing the same quantities of reactants. The purification in this case, however, consisted of removing the relatively volatile materials including the benzene and the unreacted thionyl chloride without purification of the acid chlorides by vacuum distillation.

EXAMPLE III

The procedure followed in Example I was repeated except that a like amount of the dehydrated castor oil acids was substituted for the soya fatty acids for conversion to the acid chlorides. These chlorides were purified by vacuum distillation as in Example I.

Examples IV to VI inclusive illustrate the preparation of unsaturated diester acids.

EXAMPLE IV

The preparation was carried out in a 3-neck flask provided with a mechanical agitator, a thermometer, and a condenser attached to an exhaust system. A mixture of 71.5 parts of 4,4-bis(4-hydroxyphenyl)-pentanoic acid and 136 parts of the acid chloride of soyabean oil acid from Example I was heated with agitation at 70–85° C. for a period of 3 hours, after which the temperature was gradually increased to 136° C. over a period of 2 hours and maintained at this temperature for an additional 2 hours. During the latter 4 hours of the reaction this system was evacuated to a pressure of around 30–40 mm. by using a water aspirator, to facilitate removal of the HCl. The viscous liquid product had an acid value of 89, a hydroxyl value of 21, and a saponification value of 225. Saponification value as used herein is defined as the number of milligrams of KOH which are required to saponify the ester present in a one-gram sample. The hydroxyl value as used herein is the number of milligrams of KOH equivalent to the hydroxyl content in a one-gram sample of materials.

EXAMPLE V 75 parts of the linseed oil acid chlorides from Example II and 37½ parts of 4,4-bis(4-hydroxyphenyl)-pentanoic acid, were reacted according to the procedure of Example IV. The product had an acid value of 84, a saponification value of 222, and a hydroxyl value of 8.

EXAMPLE VI

A viscous diester acid prepared in the manner described in Example IV from 75 parts of the dehydrated castor oil acid chlorides of Example III and 37½ parts of 4,4-bis(4-hydroxyphenyl)-pentanoic acid had an acid value of 86, a saponification value of 218, and a hydroxyl value of 12.

The unsaturated diester acids, prepared as described in the foregoing examples, are useful for esterification of polyhydroxy compounds to form compounds subject to polymerization through the olefin linkages whereby insoluble, infusible products valuable in coating compositions are produced. The polyhydric alcohol to be esterified may be one in which one or more of the hydroxyl groups are present in anhydrous form, i.e., as epoxides. Exemplary compositions of this nature are the epoxidized polyester resins of tetrahydrophthalic anhydride and glycols. The use of the subject diester acids in reactions of this type not only contributes the unsaturation of the long-chain acid residue for air-drying and heat conversion, but also, due to the structure of the diphenol carboxylic acid residue, imparts valuable properties to coating films prepared therefrom, including hardness, toughness and high gloss.

The adduct of the instant diester acids and epoxidized polyester resins are very valuable as film-forming agents in coating compositions. Epoxidized resins of the type described in detail in copending application S.N. 503,323, filed April 22, 1955, produce superior compounds in these reactions. The epoxidized polyester resins may be esterified with an amount of unsaturated diester acid equivalent to the epoxide content of the former, at temperatures of 100–200° C. Since this esterification reaction takes place at relatively low temperatures and in relatively short periods of time, it may be effected simultaneously with the conversion of the mixture, through its unsaturated portions, to the infusible, insoluble state. For example, a formulation to be used in a coating composition might be made up of a mixture of 1 mol of the diester acid and 1 epoxide equivalent weight of an epoxidized polyester resin, both dissolved in an organic solvent. By applying the composition in thin films and baking for 10 minutes to 2 hours, depending on the temperature, the esterification and conversion may be carried out in situ.

The following example illustrates the preparation of a typical epoxidized polyester resin of tetrahydrophthalic anhydride and 1,4-butanediol.

EXAMPLE VII

A. *Preparation of polyester from tetrahydrophthalic anhydride and 1,4-butanediol*

In a 3-neck flask provided with a thermometer, a mechanical agitator, and reflux condenser attached through a water trap was placed a mixture of 1.1 mol tetrahydrophthalic anhydride and 0.2 mol n-butanol. After melting the tetrahydrophthalic anhydride in the presence of the butanol, 1 mol of 1,4-butanediol was added. The reaction mixture was gradually heated with agitation to 225° C. at which point a sufficient amount of xylene was added to give refluxing at the esterification temperature. The reaction mixture was then heated with continuous agitation at 225–235° C. until the acid value decreased to 8.6. Acid value as herein described represents the number of milligrams of KOH equivalent to the acidity present in a one-gram sample. The product was a highly viscous, tacky solid having slight flow at room temperature.

B. *Epoxidation of the polyester resin of Part A*

In a 3-neck flask provided with a thermometer, a mechanical agitator, and a reflux condenser was placed 107 parts of the dehydrated acid form of a cation exchange resin (Dowex 50-X-8, 50–100 mesh, Dow Chemical Company) and 30 parts glacial acetic acid. The mixture of cation exchange resin and acetic acid was allowed to stand until the resin had completely taken up the acid. To this mixture was added 273 parts of the polyester resin of Part A dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 56.9. The percent non-volatile of this solution amounting to 559 parts was 50. (The epoxide values as discussed herein were determined by refluxing for 30 minutes a 2-gram sample with 50 milliliters of pyridine hydrochloride in excess pyridine. [The pyridine hydrochloride solution was prepared by adding 20 milliliters of concentrated HCl to a liter of pyridine.] After the cooling to room temperature, the sample is then back-titrated with standard alcoholic sodium hydroxide.)

The 559 parts of resin solution was thoroughly mixed with 175 parts of the dehydrated basic form of Dowex 1 (an amine type anion exchange resin).

The resulting mixture was then filtered followed by pressing as much of the solution as possible from the anion exchange resin cake. This product had an acid value of 10.1 on the non-volatile resin content. The epoxide equivalent was 304 on the non-volatile resin content. The non-volatile content was 45%.

EXAMPLE VIII

To a mixture of 20 parts of a 45% solution of the diester acid of Example IV in xylene and 10 parts of the product of Example VII was added cobalt naphthenate paint drier in a quantity amounting to .03% of the non-volatile content of the diester acid. Thin films of this varnish flowed on to tin panels and heat treated in an oven for 60 minutes at 175° C. were converted to a tack-free surface which was unaffected by exposure to boiling water for 9 hours, or by exposure to 5% aqueous NaOH for a period of 3 hours. Hard, tough, flexible films were also obtained by using a curing schedule of 10 minutes at 200° C.

It is to be understood that the above examples are intended to be illustrative only. They should not be construed as limiting the scope of the present invention since embodiments other than those specifically disclosed may be produced without departing from the invention concept taught. It is desired, therefore, that only such limitations be imposed on the appended claims as are stated therein or required by the prior art.

What is claimed is:

1. As a composition of matter the diester of (1) a 4,4-bis(hydroxyaryl) pentanoic acid, wherein the hydroxyaryl radical has 6 aromatic carbon atoms in its nuclei and is free from substitution other than chloro, bromo and alkyl groups of 1 to 5 carbon atoms, and (2) an unsaturated aliphatic monocarboxylic acid having from 10 to 26 carbon atoms.

2. The composition of claim 1 wherein (1) is 4,4-bis(4-hydroxyphenyl) pentanoic acid and (2) is a vegetable oil fatty acid.

3. The composition of claim 1 wherein (1) is 4,4-bis(4-hydroxyphenyl) pentanoic acid and (2) is a linseed oil acid.

4. The composition of claim 1 wherein (1) is 4,4-bis(4-hydroxyphenyl) pentanoic acid and (2) is a dehydrated castor oil acid.

5. The composition of claim 1 wherein (1) is 4,4-bis(4-hydroxyphenyl) pentanoic acid and (2) is a soyabean oil acid.

References Cited in the file of this patent

UNITED STATES PATENTS

| 2,134,388 | Cherry | Oct. 25, 1938 |
| 2,623,891 | Hermann | Dec. 30, 1952 |

FOREIGN PATENTS

| 189,190 | Great Britain | Nov. 20, 1922 |
| 908,496 | Germany | Apr. 5, 1954 |

OTHER REFERENCES

Bottinger: Berichte, vol. 16, pp. 2071–2075 (1883).
Bader: J.A.C.S., vol. 75, Nov. 5, 1953, pp. 5416–5417.
Bader: J.A.C.S., vol. 76, Sept. 5, 1954, p. 4464.